(12) United States Patent
Tanaka

(10) Patent No.: US 11,940,185 B2
(45) Date of Patent: Mar. 26, 2024

(54) MAGNETIC REFRIGERATION SYSTEM

(71) Applicant: DAIKIN INDUSTRIES, LTD., Osaka (JP)

(72) Inventor: Mitsuhiro Tanaka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 588 days.

(21) Appl. No.: 17/214,474

(22) Filed: Mar. 26, 2021

(65) Prior Publication Data
US 2021/0239369 A1    Aug. 5, 2021

Related U.S. Application Data

(63) Continuation of application No. PCT/JP2019/037323, filed on Sep. 24, 2019.

(30) Foreign Application Priority Data

Sep. 27, 2018    (JP) ................................. 2018-182274

(51) Int. Cl.
     *F25B 21/00*      (2006.01)
(52) U.S. Cl.
     CPC ...... *F25B 21/00* (2013.01); *F25B 2321/0022* (2013.01)
(58) Field of Classification Search
     CPC .............. F25B 21/00; F25B 2321/0022; F25B 2321/0021; Y02B 30/00
See application file for complete search history.

(56) References Cited

U.S. PATENT DOCUMENTS

| 4,674,288 A * | 6/1987 | Kuriyama | ............... F25B 21/00 62/3.3 |
| 5,156,003 A * | 10/1992 | Yoshiro | ................... F25B 21/00 505/891 |

(Continued)

FOREIGN PATENT DOCUMENTS

| EP | 2 645 015 A2 | 10/2013 |
| JP | 2012-193927 A | 10/2012 |
| JP | WO2014/013978 A1 | 1/2014 |

OTHER PUBLICATIONS

International Search Report of corresponding PCT Application No. PCT/JP2019/037323 dated Nov. 26, 2019.

(Continued)

*Primary Examiner* — Ljiljana V. Ciric
(74) *Attorney, Agent, or Firm* — Global IP Counselors, LLP

(57) ABSTRACT

A magnetic refrigeration system includes a plurality of heat transporters, a magnetic field application unit, and a drive mechanism. Each heat transporter is switched between a heat generating and heat absorbing states in response to magnetic field application and cancellation of the magnetic field application. The heat transporters are arranged between low and high temperature side heat exchangers. The magnetic field application unit applies a magnetic field to the heat transporters so that a heat transporter to which a magnetic field is applied and a heat transporter to which a magnetic field is not applied are alternately arranged. The drive mechanism periodically moves at least the plurality of heat transporters so that a heat transporter to which the magnetic field is applied is periodically switched and so that a state of thermal contact is periodically switched. An end portion of at least one heat transporter is a heat transfer accelerator.

13 Claims, 9 Drawing Sheets

(56) References Cited

U.S. PATENT DOCUMENTS

| | | | | |
|---|---|---|---|---|
| 5,209,068 | A * | 5/1993 | Saji | F25B 21/00 505/891 |
| 8,904,807 | B2 * | 12/2014 | Kaji | F25B 21/00 62/3.1 |
| 8,935,927 | B2 * | 1/2015 | Kobayashi | F25B 21/00 62/3.1 |
| 9,273,886 | B2 * | 3/2016 | Takahashi | F25B 21/00 |
| 9,618,239 | B2 * | 4/2017 | Kobayashi | F25B 21/00 |
| 9,746,214 | B2 * | 8/2017 | Zimm | F25B 21/00 |
| 10,054,340 | B2 * | 8/2018 | Watanabe | B60H 1/00478 |
| 10,443,928 | B2 * | 10/2019 | Holladay | F25J 1/0225 |
| 10,598,411 | B2 * | 3/2020 | Numazawa | F25B 21/00 |
| 11,555,652 | B2 * | 1/2023 | Holladay | F25J 1/0225 |
| 11,686,509 | B2 * | 6/2023 | Son | F25B 21/00 62/3.1 |
| 2012/0174597 | A1 * | 7/2012 | Kaji | C22C 28/00 420/416 |
| 2013/0104568 | A1 * | 5/2013 | Kuo | F25B 21/00 62/3.1 |
| 2014/0075958 | A1 | 3/2014 | Takahashi et al. | |
| 2014/0311165 | A1 * | 10/2014 | Watanabe | B60H 1/32 62/3.1 |
| 2018/0283772 | A1 * | 10/2018 | Holladay | H01F 1/015 |
| 2019/0285319 | A1 * | 9/2019 | Bae | F25B 30/06 |
| 2020/0003461 | A1 * | 1/2020 | Bae | F25B 21/00 |
| 2020/0191449 | A1 * | 6/2020 | Bae | H01F 1/012 |
| 2020/0318865 | A1 * | 10/2020 | Niiyama | F25B 21/00 |
| 2020/0378654 | A1 * | 12/2020 | Ookawa | F25B 21/00 |
| 2020/0400351 | A1 * | 12/2020 | Takeda | F25B 21/00 |
| 2021/0164706 | A1 * | 6/2021 | Teraki | F24F 5/0007 |
| 2021/0239369 | A1 * | 8/2021 | Tanaka | F25B 21/00 |
| 2022/0214091 | A1 * | 7/2022 | Yoshimoto | F25B 47/02 |
| 2022/0221201 | A1 * | 7/2022 | Teraki | F25B 21/00 |
| 2022/0268494 | A1 * | 8/2022 | Mamiya | C22C 28/00 |
| 2022/0412610 | A1 * | 12/2022 | Teraki | F25B 21/02 |
| 2023/0019748 | A1 * | 1/2023 | Kawabata | F25B 21/00 |

OTHER PUBLICATIONS

International Preliminary Report of corresponding PCT Application No. PCT/JP2019/037323 dated Apr. 8, 2021.
European Search Report of corresponding EP Application No. 19 86 6131.6 dated May 23, 2022.

* cited by examiner

… (1)

MAGNETIC REFRIGERATION SYSTEM

CROSS-REFERENCE TO RELATED APPLICATIONS

This is a continuation of International Application No. PCT/JP2019/037323 filed on Sep. 24, 2019, which claims priority to Japanese Patent Application No. 2018-182274, filed on Sep. 27, 2018. The entire disclosures of these applications are incorporated by reference herein.

BACKGROUND

Field of Invention

The present disclosure relates to a magnetic refrigeration system.

Background Information

Japanese Unexamined Patent Application Publication No. 2012-193927 discloses a magnetic refrigerator that transports heat. The magnetic refrigerator includes a magnetic body unit in which magnetic bodies are arranged at intervals in a plurality of rows, a low-temperature-side heat exchanger that is adjacent at an interval to a magnetic body positioned at one end of the magnetic body unit, a high-temperature-side heat exchanger that is adjacent at an interval to a magnetic body positioned at the other end of the magnetic body unit, a heat conductive member, a magnetism applicator, and a controller. The heat conductive member alternately performs, via a solid heat conductive portion, either of heat conduction between adjacent magnetic bodies in the magnetic body unit or heat conduction between the magnetic body positioned at one end of the magnetic body unit and the low-temperature-side heat exchanger and between the magnetic body positioned at the other end of the magnetic body unit and the high-temperature-side heat exchanger. The magnetism applicator alternately applies magnetism to either of the magnetic body positioned at one end of the magnetic body unit or the magnetic body positioned at the other end of the magnetic body unit. The controller controls the operations of the heat conductive member and the magnetism applicator.

SUMMARY

According to a first aspect of the present disclosure, a magnetic refrigeration system transports heat from a low-temperature-side heat exchanger toward a high-temperature-side heat exchanger. The magnetic refrigeration system includes a plurality of heat transporters, a magnetic field application unit, and a drive mechanism. Each heat transporter is configured to be switched between a heat-generating state and a heat-absorbing state in response to magnetic field application and cancellation of the magnetic field application. The heat transporters are arranged between the low-temperature-side heat exchanger and the high-temperature-side heat exchanger. The magnetic field application unit applies a magnetic field to the plurality of heat transporters so that a heat transporter of the heat transports to which a magnetic field is applied and a heat transporter of the heat transporters to which a magnetic field is not applied are alternately arranged in a heat transport direction from the low-temperature-side heat exchanger toward the high-temperature-side heat exchanger. The drive mechanism periodically moves at least the plurality of heat transporters so that a heat transporter to which the magnetic field is applied by the magnetic field application unit is periodically switched and so that a state of thermal contact among the low-temperature-side heat exchanger, the plurality of heat transporters, and the high-temperature-side heat exchanger is periodically switched. An end portion of at least one heat transporter of the plurality of heat transporters, in the heat transport direction, is a heat transfer accelerator that accelerates heat transfer.

DETAILED DESCRIPTION OF EMBODIMENT(S)

Hereafter, embodiments will be described with reference to the drawings. The same or corresponding elements in the figures will be denoted by the same numerals and descriptions thereof will not be repeated.

First Embodiment

Figure 1:
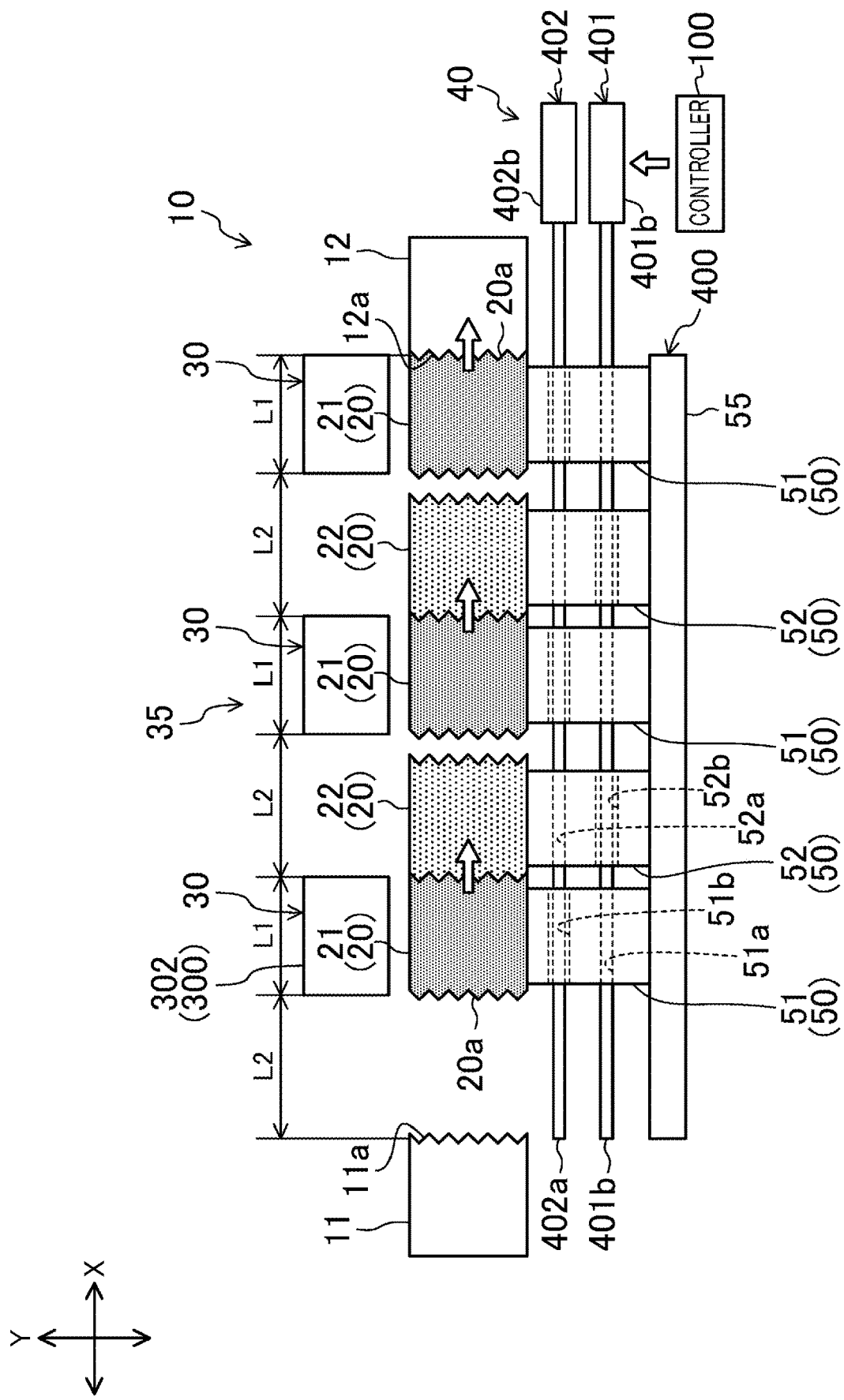
FIG. 1 is an XY-plan view of an example of the configuration (first state) of a magnetic refrigeration system according to a first embodiment.
Figure 2:
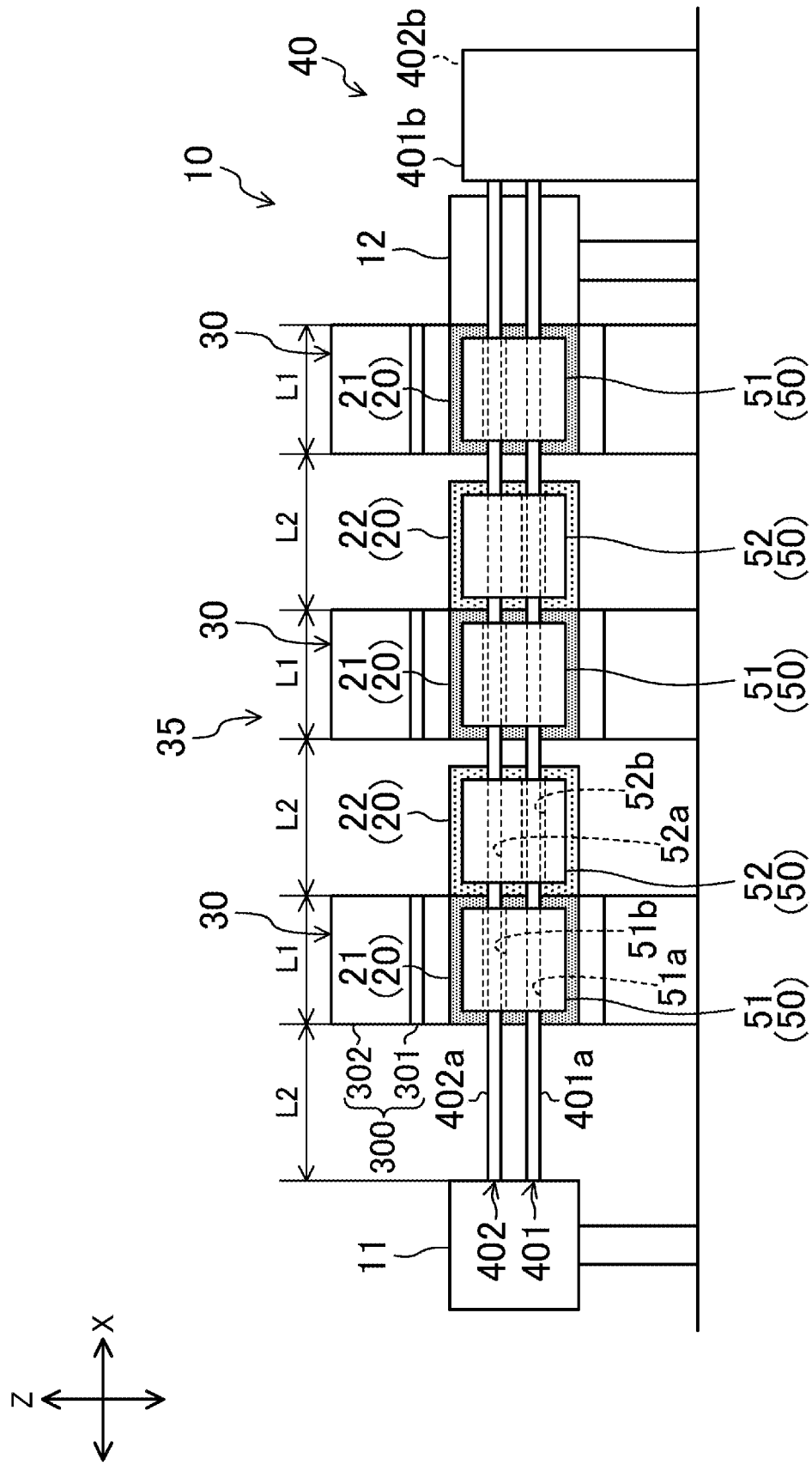
FIG. 2 is an XZ-plan view of the example of the configuration (first state) of the magnetic refrigeration system according to the first embodiment.

FIGS. 1 and 2 illustrate examples of the configuration of a magnetic refrigeration system (10) according to a first embodiment. The magnetic refrigeration system (10) transports heat from a low-temperature-side heat exchanger (11) toward a high-temperature-side heat exchanger (12). To be specific, the magnetic refrigeration system (10) includes a plurality of heat transporters (20), a magnetic field application unit (35), a drive mechanism (40), and a controller (100).

Hereafter, a heat transport direction that is a direction from the low-temperature-side heat exchanger (11) toward the high-temperature-side heat exchanger (12) is defined as the X-axis direction, a first direction perpendicular to the heat transport direction is defined as the Y-axis direction, and a direction perpendicular to the heat transport direction and the first direction is defined as the Z-axis direction. Hereafter, examples in which the Z-axis direction is the vertical direction will be described.

Heat Transporter

Each of the plurality of heat transporters (20) is configured to be switched between a heat-generating state and a heat-absorbing state in response to magnetic field application and cancellation of magnetic field application. The plurality of heat transporters (20) are arranged between the low-temperature-side heat exchanger (11) and the high-temperature-side heat exchanger (12). Each of the plurality of heat transporters (20) contains a magnetic working substance having a magnetocaloric effect. Examples of the magnetic working substance include $Gd_5(Ge_{0.5}Si_{0.5})_4$, $La(Fe_{1-x}Si_x)_{13}$, $La(Fe_{1-x}CO_xSi_y)_{13}$, $La(Fe_{1-x}Si_x)_{13}Hy$, and $Mn(As_{0.9}Sb_{0.1})$.

In this example, the heat transporter (20) enters a heat-generating state due to magnetic field application, and enters a heat-absorbing state due to cancellation of magnetic field application. That is, the heat transporter (20) is made of a working substance that generates heat due to magnetic field application and absorbs heat due to cancellation of magnetic field application. In this example, the heat transporter (20) has a rectangular-parallelepiped shape.

The plurality of heat transporters (20) at least include two first heat transporters (21) that are arranged at an interval in the heat transport direction (the X-axis direction) and one second heat transporter (22) disposed between the two first heat transporters (21). In this example, five heat transporters (20) are arranged in the heat transport direction between the low-temperature-side heat exchanger (11) and the high-temperature-side heat exchanger (12). The five heat transporters (20) include three first heat transporters (21) that are arranged at intervals in the heat transport direction and two second heat transporters (22) that are respectively disposed between the three first heat transporters (21).

Hereafter, the length of a heat transporter (20) in the heat transport direction will be referred to as a "first distance length (L1)", and a length that is the sum of the first distance length (L1) and the length in the heat transport direction of a gap that enables two heat transporters (20) that are adjacent to each other in the heat transport direction to be thermally detached from each other will be referred to as a "second distance length (L2)".

Magnetic Field Application Unit

The magnetic field application unit (35) applies a magnetic field to the plurality of heat transporters (20) so that, among the plurality of heat transporters (20), heat transporters (20) to which a magnetic field is applied and heat transporters (20) to which a magnetic field is not applied are alternately arranged in the heat transport direction (the X-axis direction).

In this example, the magnetic field application unit (35) includes a plurality of magnetic field applicators (30). Each of the plurality of magnetic field applicators (30) is configured to apply a magnetic field. The plurality of magnetic field applicators (30) are arranged at predetermined intervals in the heat transport direction.

To be specific, in this example, three magnetic field applicators (30) are arranged in the heat transport direction. That is, the 1st magnetic field applicator (30), the 2nd magnetic field applicator (30), and the 3rd magnetic field applicator (30) are arranged in order from the low-temperature side (the low-temperature-side heat exchanger (11) side) toward the high-temperature side (the high-temperature-side heat exchanger (12) side) in the heat transport direction.

The 1st magnetic field applicator (30) is disposed in a section (a first magnetic-field-application section) between a first point that is positioned at the second distance length (L2) from the low-temperature-side heat exchanger (11) in the heat transport direction and a second point that is positioned at the first distance length (L1) from the first point in the heat transport direction. The 2nd magnetic field applicator (30) is disposed in a section (a second magnetic-field-application section) between a third point that is positioned at the second distance length (L2) from the second point in the heat transport direction and a fourth point that is positioned at the first distance length (L1) from the third point in the heat transport direction. The 3rd magnetic field applicator (30) is disposed in a section (a third magnetic-field-application section) between a fifth point that is positioned at the second distance length (L2) from the fourth point in the heat transport direction and a sixth point that is positioned at the first distance length (L1) from the fifth point in the heat transport direction. The high-temperature-side heat exchanger (12) is positioned at the sixth point. The effective length of the magnetic field applicator (30) in the heat transport direction (the length of a range across which the magnetic field applicator (30) can apply a magnetic field) is set less than or equal to the first distance length (L1).

That is, in this example, the first magnetic-field-application section is a section to which a magnetic field is applied by the 1st magnetic field applicator (30), the second magnetic-field-application section is a section to which a magnetic field is applied by the 2nd magnetic field applicator (30), and the third magnetic-field-application section is a section to which a magnetic field is applied by the 3rd magnetic field applicator (30). A section (a first magnetic-field-application-cancellation section) between the low-temperature-side heat exchanger (11) and the first magnetic-field-application section, a section (a second magnetic-field-application-cancellation section) between the first magnetic-field-application section and the second magnetic-field-application section, and a section (a third magnetic-field-application-cancellation section) between the second magnetic-field-application section and the third magnetic-field-application section are sections to which a magnetic field is not applied by the magnetic field application unit (35).

For example, when the heat transporter (20) moves into the first magnetic-field-application section, a magnetic field is applied to the heat transporter (20) and the heat transporter (20) is switched from a heat-absorbing state to a heat-generating state; and, when the heat transporter (20) moves out of the first magnetic-field-application section, magnetic field application to the heat transporter (20) is cancelled and the heat transporter (20) changes from a heat-generating state to a heat-absorbing state. The same applies to the second magnetic-field-application section and the third magnetic-field-application section.

Figure 3:
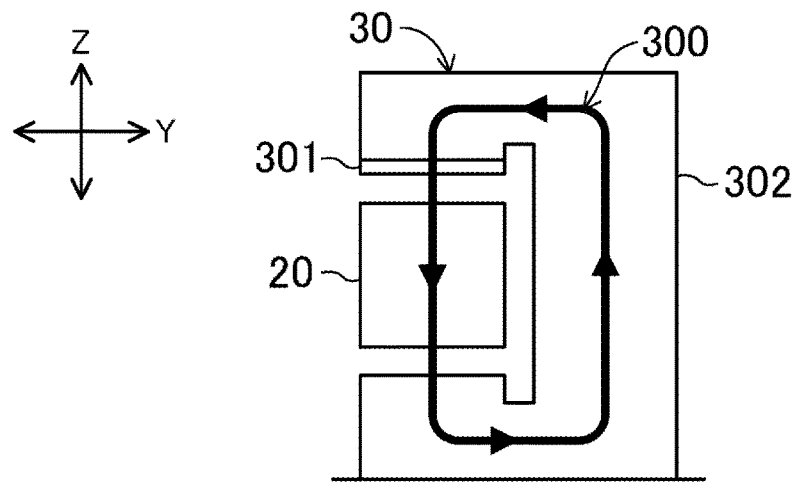
FIG. 3 is a YZ-plan view of the example of the configuration of the magnetic field applicator shown in FIG. 1.

As illustrated in FIG. 3, the magnetic field applicator (30) is included in a magnetic circuit (300). The magnetic circuit (300) is constituted by a magnet (301) and a yoke (302). The magnet (301) is, for example, a permanent magnet. The yoke (302) is made of a magnetic material (such as iron). In this example, the yoke (302) includes two arm portions each of which has a C-shape in a cross section in the YZ-plane, the two arm portions facing each other at a predetermined interval in the Z-axis direction. The magnet (301) has a rectangular-parallelepiped shape that is flat the Z-axis direction and is fixed to one of the arm portions (in this example, an upper arm portion) of the yoke (302). With such a configuration, it is possible to apply a magnetic field to the heat transporter (20) disposed between the magnet (301) and the other arm portion (in this example, a lower arm portion)

of the yoke (302). That is, in this example, the magnetic field applicator (30) is provided between the two arm portions of the yoke (302).

Drive Mechanism

The drive mechanism (40) periodically moves at least the plurality of heat transporters (20), among the plurality of heat transporters (20) and the magnetic field application unit (35), so that a heat transporter (20), among the plurality of heat transporters (20), to which a magnetic field is applied by the magnetic field application unit (35) is periodically switched and so that a state of thermal contact among the low-temperature-side heat exchanger (11), the plurality of heat transporters (20), and the high-temperature-side heat exchanger (12) is periodically switched.

Figure 5:
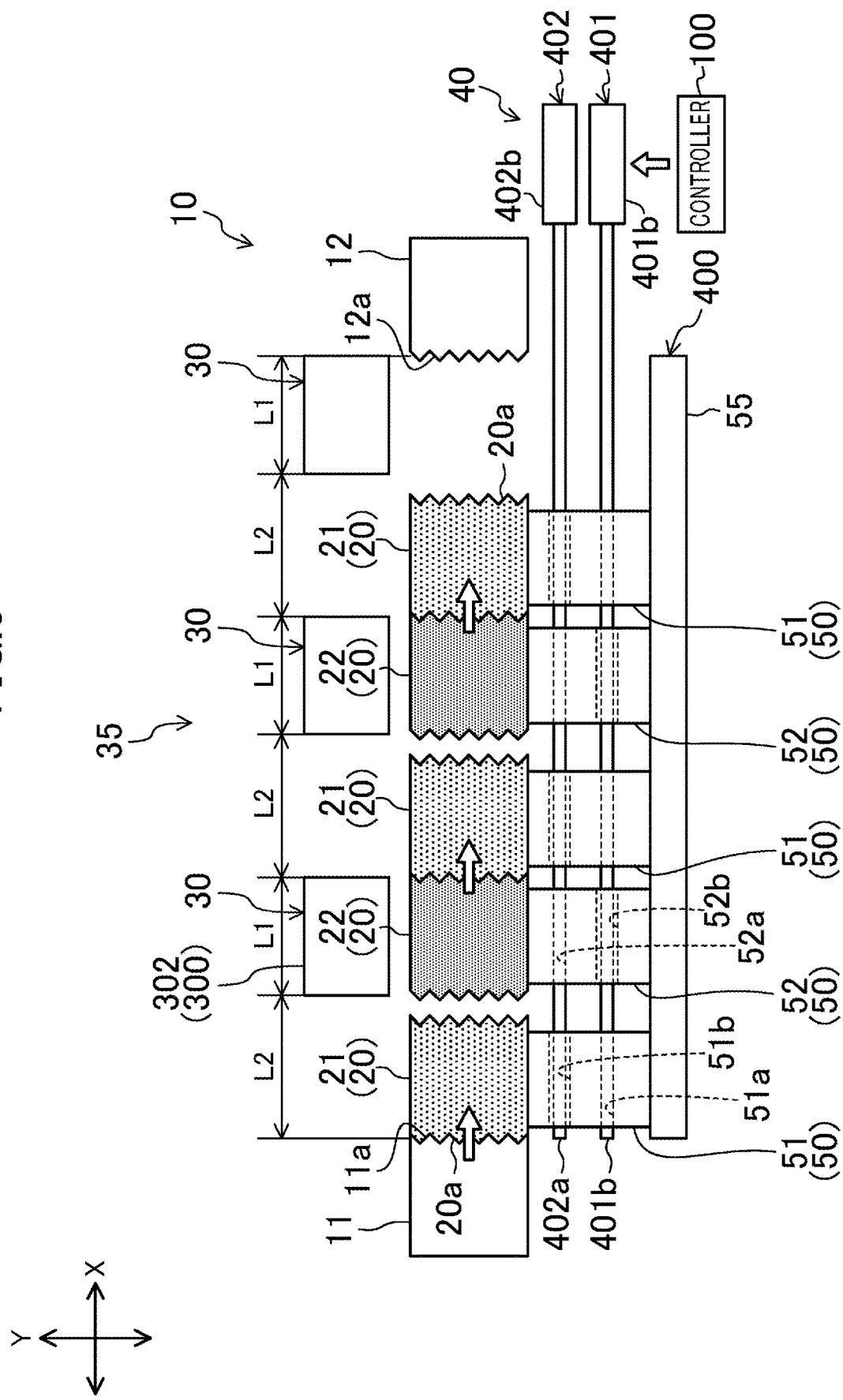
FIG. 5 is an XY-plan view of an example of the configuration (second state) of the magnetic refrigeration system according to the first embodiment.

In this example, the magnetic field application unit (35) is fixed. The drive mechanism (40) moves the plurality of heat transporters (20) in the heat transport direction (the X-axis direction). To be specific, the drive mechanism (40) switches the state of the plurality of heat transporters (20) between a first state (a state illustrated in FIG. 1) and a second state (a state illustrated in FIG. 5). In FIGS. 1 and 5, heat transporters (20) that are in a heat-generating state due to magnetic field application are shaded with small dots, and heat transporters (20) that are in a heat-absorbing state due to cancellation of magnetic field application are shaded with large dots.

First State

As illustrated in FIG. 1, in the first state, the first heat transporters (21) are disposed in sections to which a magnetic field is applied by the magnetic field application unit (35), and the second heat transporters (22) are disposed in sections to which a magnetic field is not applied by the magnetic field application unit (35). In this example, three first heat transporters (21) are disposed in three magnetic-field-application sections, and two second heat transporters (22) are disposed in two magnetic-field-application-cancellation sections (the second magnetic-field-application-cancellation section and the third magnetic-field-application-cancellation section). Thus, the first heat transporters (21) are in a heat-generating state, and the second heat transporters (22) are in a heat-absorbing state. A first heat transporter (21) in a heat-generating state is thermally in contact with a second heat transporter (22) in a heat-absorbing state that is adjacent to the high-temperature side of the first heat transporter (21) in the heat transport direction or with the high-temperature-side heat exchanger (12), and is thermally detached from a second heat transporter (22) in a heat-absorbing state that is adjacent to the low-temperature side of the first heat transporter (21) in the heat transport direction or from the low-temperature-side heat exchanger (11).

Second State

As illustrated in FIG. 5, in the second state, the second heat transporters (22) are disposed in sections to which a magnetic field is applied by the magnetic field application unit (35), and the first heat transporters (21) are disposed in sections to which a magnetic field is not applied by the magnetic field application unit (35). In this example, two second heat transporters (22) are disposed in two magnetic-field-application sections (the first magnetic-field-application section and the second magnetic-field-application section), and three first heat transporters (21) are disposed in three magnetic-field-application-cancellation sections. Thus, the second heat transporters (22) are in a heat-generating state, and the first heat transporters (21) are in a heat-absorbing state. A first heat transporter (21) in a heat-absorbing state is thermally in contact with a second heat transporter (22) in a heat-generating state that is adjacent to the low-temperature side of the first heat transporter (21) in the heat transport direction or with the low-temperature-side heat exchanger (11), and is thermally detached from a second heat transporter (22) in a heat-generating state that is adjacent to the high-temperature side of the first heat transporter (21) in the heat transport direction or from the high-temperature-side heat exchanger (12).

In this example, "a state in which two members are thermally in contact with each other" refers to a state in which the two members are directly in contact with each other, and "a state in which two members are thermally detached from each other" refers to a state in which the two members are separated from each other with a predetermined gap therebetween.

Configuration of Drive Mechanism

In the first embodiment, the drive mechanism (40) includes a movable support mechanism (400), a first slide mechanism (401), and a second slide mechanism (402).

Movable Support Mechanism

The movable support mechanism (400) supports the plurality of heat transporters (20) so as to be movable in the heat transport direction (the X-axis direction). In this example, the movable support mechanism (400) includes a plurality of movable bases (50) and a guide member (55).

Each of the plurality of movable bases (50) has a rectangular-parallelepiped shape. The plurality of movable bases (50) are arranged in the heat transport direction, are respectively coupled to the plurality of heat transporters (20) that are arranged in the heat transport direction, and respectively support the plurality of heat transporters (20). The guide member (55) extends in the heat transport direction, and guides the plurality of movable bases (50) in the heat transport direction.

The plurality of movable bases (50) include first movable bases (51) that support first heat transporters (21) and second movable bases (52) that support second heat transporters (22). In this example, five movable bases (50), respectively corresponding to five heat transporters (20), are arranged in the heat transport direction. The five movable bases (50) include three first movable bases (51) that are arranged at intervals in the heat transport direction and that respectively correspond to the three first heat transporters (21) and two second movable bases (52) that are respectively disposed between the three first movable bases (51) and that respectively correspond to the two second heat transporters (22).

In the first movable base (51), a first screw hole (51a) and a first insertion hole (51b) are provided. A first ball screw (401a) (described below) is inserted into the first screw hole (51a), and the first screw hole (51a) meshes with the first ball screw (401a). A second ball screw (402a) (described below) is inserted into the first insertion hole (51b), but the first insertion hole (51b) does not mesh with the second ball screw (402a).

In the second movable base (52), a second screw hole (52a) and a second insertion hole (52b) are provided. The second ball screw (402a) (described below) is inserted into the second screw hole (52a), and the second screw hole (52a) meshes with the second ball screw (402a). The first ball screw (401a) (described below) is inserted into the second insertion hole (52b), but the second insertion hole (52b) does not mesh with the first ball screw (401a).

First Slide Mechanism

The first slide mechanism (401) moves the first heat transporter (21) in the heat transport direction (the X-axis direction). In this example, the first slide mechanism (401) includes the first ball screw (401a) and a first motor (401b).

The first ball screw (401a) extends in the heat transport direction, and is inserted into the first screw hole (51a) of the first movable base (51) and the second insertion hole (52b) of the second movable base (52). The first ball screw (401a) meshes with the first screw hole (51a) of the first movable base (51), but does not mesh with the second insertion hole (52b) of the second movable base (52).

The first motor (401b) rotates the first ball screw (401a). When the first ball screw (401a) is rotated in a first rotation direction, the first movable base (51), in which the first screw hole (51a) that meshes with the first ball screw (401a) is provided, moves from one side toward the other side in the heat transport direction, and the first heat transporter (21) moves from one side toward the other side in the heat transport direction together with the first movable base (51). When the first ball screw (401a) is rotated in a second rotation direction opposite to the first rotation direction, the first movable base (51), in which the first screw hole (51a) that meshes with the first ball screw (401a) is provided, moves from the other side toward one side in the heat transport direction, and the first heat transporter (21) moves from the other side toward one side in the heat transport direction together with the first movable base (51).

Second Slide Mechanism

The second slide mechanism (402) moves the second heat transporter (22) in the heat transport direction (the X-axis direction). In this example, the second slide mechanism (402) includes the second ball screw (402a) and a second motor (402b).

The second ball screw (402a) extends in the heat transport direction, and is inserted into the second screw hole (52a) of the second movable base (52) and the first insertion hole (51b) of the first movable base (51). The second ball screw (402a) meshes with the second screw hole (52a) of the second movable base (52), but does not mesh with the first insertion hole (51b) of the first movable base (51).

The second motor (402b) rotates the second ball screw (402a). When the second ball screw (402a) is rotated in a first rotation direction, the second movable base (52), in which the second screw hole (52a) that meshes with the second ball screw (402a) is provided, moves from one side toward the other side in the heat transport direction, and the second heat transporter (22) moves from one side toward the other side in the heat transport direction together with the second movable base (52). When the second ball screw (402a) is rotated in a second rotation direction opposite to the first rotation direction, the second movable base (52), in which the second screw hole (52a) that meshes with the second ball screw (402a) is provided, moves from the other side toward one side in the heat transport direction, and the second heat transporter (22) moves from the other side toward one side in the heat transport direction together with the second movable base (52).

Controller

The controller (100) controls the operation of the drive mechanism (40). For example, the controller (100) is constituted by a processor and a memory that is electrically connected to the processor and that stores programs, information, and the like for operating the processor.

Configuration of Heat Transporter

An end portion (20a) of at least one heat transporter (20), among the plurality of heat transporters (20), in the heat transport direction (the X-axis direction) is a heat transfer accelerator that accelerates heat transfer. To be specific, an end surface of at least one heat transporter (20), among the plurality of heat transporters (20), in the heat transport direction is an uneven surface. In this example, in all of the plurality of heat transporters (20), both end portions (20a) of the heat transporter (20) in the heat transport direction are heat transfer accelerators. To be specific, in all of the plurality of heat transporters (20), both end surfaces of the heat transporter (20) in the heat transport direction are uneven surfaces.

In this example, end surfaces in the heat transport direction of two heat transporters (20) that are adjacent to each other in the heat transport direction (that is, uneven surfaces that are in contact with each other) are configured to be fitted to each other. With such a configuration, the area of contact between the two heat transporters (20) can be increased, and thus heat transfer between the two heat transporters (20) can be accelerated.

In this example, a contact surface (11a) of the low-temperature-side heat exchanger (11) is a surface that thermally contacts a heat transporter (20) that is positioned adjacent to the low-temperature-side heat exchanger (11) in the heat transport direction, and is an uneven surface. The contact surface (11a) of the low-temperature-side heat exchanger (11) and an end surface of the heat transporter (20) in the heat transport direction, which are adjacent to each other in the heat transport direction, (that is, uneven surfaces that are in contact with each other) are configured to be fitted to each other. With such a configuration, the area of contact between the low-temperature-side heat exchanger (11) and the heat transporter (20) can be increased, and thus heat transfer between the low-temperature-side heat exchanger (11) and the heat transporter (20) can be accelerated.

In this example, a contact surface (12a) of the high-temperature-side heat exchanger (12) is a surface that thermally contacts a heat transporter (20) that is positioned adjacent to the high-temperature-side heat exchanger (12) in the heat transport direction, and is an uneven surface. The contact surface (12a) of the high-temperature-side heat exchanger (12) and an end surface of the heat transporter (20) in the heat transport direction, which are adjacent to each other in the heat transport direction, (that is, uneven surfaces that are in contact with each other) are configured to be fitted to each other. With such a configuration, the area of contact between the high-temperature-side heat exchanger (12) and the heat transporter (20) can be increased, and thus heat transfer between the high-temperature-side heat exchanger (12) and the heat transporter (20) can be accelerated.

Internal Structure of Heat Transporter

Figure 4:
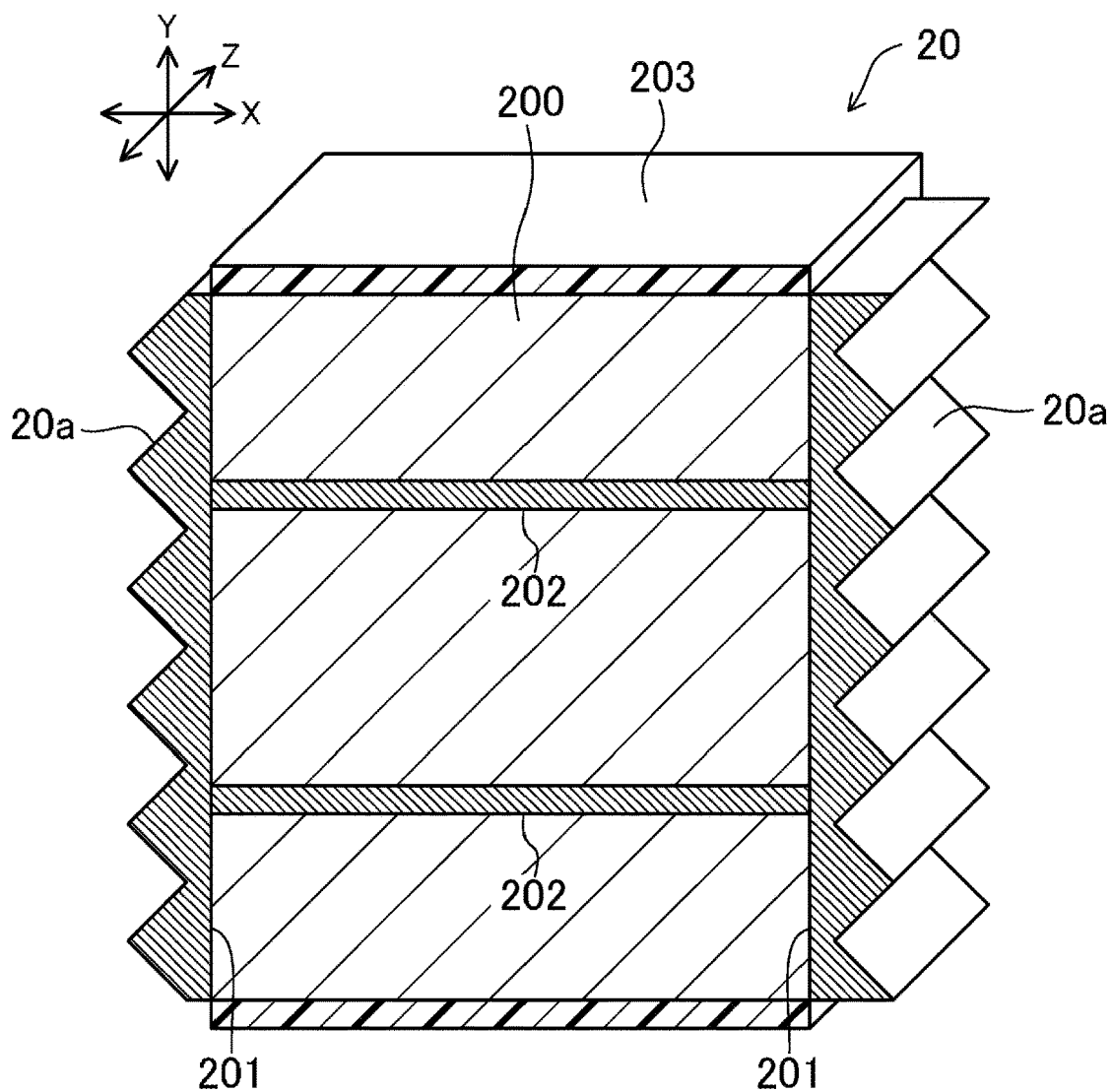
FIG. 4 is a sectional perspective view of an example of the configuration of a heat transporter shown in FIG. 1.

As illustrated in FIG. 4, among the plurality of heat transporters (20), at least one heat transporter (20) (in this example, all of the plurality of heat transporters (20)) includes a body (200), a first heat-transfer member (201), and a second heat-transfer member (202).

Body

The body (200) is made of a magnetic working substance. The body (200) is switched between a heat-generating state and a heat-absorbing state in response to magnetic field application and cancellation of magnetic field application. In this example, the body (200) has a rectangular-parallelepiped shape.

First Heat-Transfer Member

The first heat-transfer member (201) has a heat conductivity higher than the heat conductivity of the body (200). To be specific, the first heat-transfer member (201) is made of a high heat transfer material having a heat-transfer coefficient higher than the heat-transfer coefficient of the magnetic working substance. Examples of the high heat transfer material include: metals, such as gold, silver, copper, and aluminum; heat transfer grease; liquid metals (alloys such as gallium-indium); graphite; and carbon nanotube. The first heat-transfer member (201) is provided at an end portion of the body (200) in the heat transport direction and constitutes an end portion (20a) of the heat transporter (20) in the heat transport direction. In this example, the first heat-transfer member (201) is made of a solid such as a metal and has a rectangular plate-like shape. The outer surface of the first heat-transfer member (201) is an uneven surface.

Second Heat-Transfer Member

The second heat-transfer member (202) has a heat conductivity higher than the heat conductivity of the body (200). To be specific, the second heat-transfer member (202) is made of a high heat transfer material having a heat-transfer coefficient higher than the heat-transfer coefficient of the magnetic working substance. The second heat-transfer member (202) extends through the inside of the body (200) in the heat transport direction and is connected to the first heat-transfer member (201). The second heat-transfer member (202) may have a bar-like shape or a plate-like shape.

Heat Insulation Member

As illustrated in FIG. 4, a heat insulation member (203) is provided in at least one heat transporter (20), among the plurality of heat transporters (20). The heat insulation member (203) covers a part of the heat transporter (20) excluding both end surfaces in the heat transport direction. The heat insulation member (203) has heat insulation ability higher than the heat insulation ability of the body (200). To be specific, the heat insulation member (203) is made of a high heat-insulation material having heat insulation ability higher than the heat insulation ability of the magnetic working substance. Examples of the high heat-insulation material include foamed resins and glass wool. In this example, the heat insulation member (203) has a rectangular pipe shape.

Operation of Magnetic Refrigeration System

Next, referring to FIGS. 1 and 5, the operation of the magnetic refrigeration system (10) according to the first embodiment will be described. In FIGS. 1 and 5, blank arrows indicate the direction in which heat is transported.

As illustrated in FIG. 1, in the first state, three first heat transporters (21) are disposed in three magnetic-field-application sections to which a magnetic field is applied by the magnetic field application unit (35), and two second heat transporters (22) are disposed in two magnetic-field-application-cancellation sections (the second magnetic-field-application-cancellation section and the third magnetic-field-application-cancellation section) to which a magnetic field is not applied by the magnetic field application unit (35). Thus, the three first heat transporters (21) are in a heat-generating state, and the two second heat transporters (22) are in a heat-absorbing state. Each of the three first heat transporters (21) in a heat-generating state is thermally in contact with a second heat transporter (22) in a heat-absorbing state that is adjacent to the high-temperature side of the first heat transporter (21) in the heat transport direction (the X-axis direction) or with the high-temperature-side heat exchanger (12), and is thermally detached from a second heat transporter (22) in a heat-absorbing state that is adjacent to the low-temperature side of the first heat transporter (21) in the heat transport direction or from the low-temperature-side heat exchanger (11). Thus, heat is transported from the first heat transporter (21) in a heat-generating state toward the second heat transporter (22) in a heat-absorbing state (or the high-temperature-side heat exchanger (12)) that is thermally in contact with the first heat transporter (21) in a heat-generating state.

Next, when a predetermined period elapses after the state of the plurality of heat transporters (20) is switched to the first state, the drive mechanism (40) moves the three first heat transporters (21) by the second distance length (L2) and the two second heat transporters (22) by the first distance length (L1), toward the low-temperature side (the low-temperature-side heat exchanger (11) side) in the heat transport direction. Thus, the state of the plurality of heat transporters (20) changes from the first state (a state illustrated in FIG. 1) to the second state (a state illustrated in FIG. 5).

As illustrated in FIG. 5, in the second state, two second heat transporters (22) are disposed in two magnetic-field-application sections (the first magnetic-field-application section and the second magnetic-field-application section) to which a magnetic field is applied by the magnetic field application unit (35), and three first heat transporters (21) are disposed in three magnetic-field-application-cancellation sections to which a magnetic field is not applied by the magnetic field application unit (35). Thus, the two second heat transporters (22) are in a heat-generating state, and the three first heat transporters (21) are in a heat-absorbing state. Each of the three first heat transporters (21) in a heat-absorbing state is thermally in contact with a second heat transporter (22) in a heat-generating state adjacent to the low-temperature side of the first heat transporter (21) in the heat transport direction (the X-axis direction) or with the low-temperature-side heat exchanger (11), and is thermally detached from a second heat transporter (22) in a heat-generating state adjacent to the high-temperature side of the first heat transporter (21) in the heat transport direction or from the high-temperature-side heat exchanger (12). Thus, heat is transported from second heat transporter (22) in a heat-generating state (or the low-temperature-side heat exchanger (11)) toward the first heat transporter (21) in a heat-absorbing state (or the low-temperature-side heat exchanger (11)) that is thermally in contact with the second heat transporter (22) in a heat-generating state.

Next, when a predetermined period elapses after the state of the plurality of heat transporters (20) is switched to the second state, the drive mechanism (40) moves the three first heat transporters (21) by the second distance length (L2) and the two second heat transporters (22) by the first distance length (L1), toward the high-temperature side (the high-temperature-side heat exchanger (12) side) in the heat transport direction. Thus, the state of the plurality of heat transporters (20) changes from the second state (a state illustrated in FIG. 5) to the first state (a state illustrated in FIG. 1).

When the aforementioned operations are repeatedly performed, temperature in the low-temperature-side heat exchanger (11) gradually decreases, and temperature in the high-temperature-side heat exchanger (12) gradually increases.

Advantageous Effects of First Embodiment

As described above, the magnetic refrigeration system (10) according to the first embodiment transports heat from the low-temperature-side heat exchanger (11) toward the high-temperature-side heat exchanger (12). The magnetic refrigeration system (10) includes the plurality of heat transporters (20), the magnetic field application unit (35), and the drive mechanism (40). The plurality of heat transporters (20) are each configured to be switched between a heat-generating state and a heat-absorbing state in response to magnetic field application and cancellation of the magnetic field application. The plurality of heat transporters (20) are arranged between the low-temperature-side heat exchanger (11) and the high-temperature-side heat exchanger (12). The magnetic field application unit (35) applies a magnetic field to the plurality of heat transporters (20) so that a heat transporter (20) to which a magnetic field is applied and a heat transporter (20) to which a magnetic field is not applied, among the plurality of heat transporters (20), are alternately arranged in the heat transport direction from the low-temperature-side heat exchanger (11) toward the high-temperature-side heat exchanger (12). The drive mechanism (40) periodically moves at least the plurality of heat transporters (20), among the plurality of heat transporters (20) and the magnetic field application unit (35), so that a heat transporter (20), among the plurality of heat transporters (20), to which a magnetic field is applied by the magnetic field application unit (35) is periodically switched and so that a state of thermal contact among the low-temperature-side heat exchanger (11), the plurality of heat transporters (20), and the high-temperature-side heat exchanger (12) is periodically switched. An end portion (20a) of at least one heat transporter (20), among the plurality of heat transporters (20), in the heat transport direction is a heat transfer accelerator that accelerates heat transfer.

With the first embodiment, because the end portion (20a) of the heat transporter (20) in the heat transport direction is a heat transfer accelerator, heat transfer between the heat transporter (20) and a member that thermally contacts the heat transporter (20) (the low-temperature-side heat exchanger (11), the high-temperature-side heat exchanger (12), or another heat transporter (20)) can be accelerated. Thus, the efficiency of heat transport can be improved.

In the magnetic refrigeration system (10) according to the first embodiment, an end surface of at least one heat transporter (20), among the plurality of heat transporters (20), in the heat transport direction is an uneven surface.

With the first embodiment, because the end surface of the heat transporter (20) in the heat transport direction is an uneven surface, compared with a case where the end surface of the heat transporter (20) in the heat transport direction is a flat surface, the area of the end surface of the heat transporter (20) in the heat transport direction (that is, the heat transfer area) can be increased, and thus heat transfer at the end portion of the heat transporter (20) in the heat transport direction can be accelerated. That is, the end portion of the heat transporter (20) in the heat transport direction can be made to be a heat transfer accelerator. Thus, the efficiency of heat transport can be improved.

In the magnetic refrigeration system (10) according to the first embodiment, at least one heat transporter (20), among the plurality of heat transporters (20), includes the body (200) and the first heat-transfer member (201). The body (200) is made of a magnetic working substance having a magnetocaloric effect and is switched between a heat-generating state and a heat-absorbing state in response to the magnetic field application and cancellation of the magnetic field application. The first heat-transfer member (201) has a heat conductivity higher than a heat conductivity of the body (200), is provided at an end portion of the body (200) in the heat transport direction, and constitutes an end portion (20a) of the heat transporter (20) in the heat transport direction.

With the first embodiment, because the end portion of the heat transporter (20) in the heat transport direction is constituted by the first heat-transfer member (201), heat transfer at the end portion of the heat transporter (20) in the heat transport direction can be accelerated. That is, the end portion of the heat transporter (20) in the heat transport direction can be made to be a heat transfer accelerator. Thus, the efficiency of heat transport can be improved.

In the magnetic refrigeration system (10) according to the first embodiment, at least one heat transporter (20) among the plurality of heat transporters (20) further includes the second heat-transfer member (202). The second heat-transfer member (202) has a heat conductivity higher than a heat conductivity of the body (200), extends inside of the body (200) in the heat transport direction, and is connected to the first heat-transfer member (201).

In the first embodiment, because the second heat-transfer member (202) is provided inside the body (200) of the heat transporter (20), heat transfer in the heat transporter (20) in the heat transport direction can be accelerated. Thus, the efficiency of heat transport can be improved.

In the magnetic refrigeration system (10) according to the first embodiment, a heat insulation member (203) is provided in at least one heat transporter (20), among the plurality of heat transporters (20). The heat insulation member (203) covers a part of the heat transporter (20) excluding both end surfaces in the heat transport direction.

With the first embodiment, because a part of the heat transporter (20) excluding both end surfaces in the heat transport direction is covered by the heat insulation member (203), dissipation of heat of the heat transporter (20) can be suppressed and heat transfer in the heat transporter (20) in the heat transport direction can be accelerated. Thus, the efficiency of heat transport can be improved.

In the magnetic refrigeration system (10) according to the first embodiment, the magnetic field application unit (35) is fixed. The drive mechanism (40) moves the plurality of heat transporters (20) in the heat transport direction.

With the first embodiment, because the magnetic field application unit (35) is fixed, a mechanism for periodically moving the magnetic field application unit (35) can be omitted. Thus, compared with a case where the magnetic field application unit (35) is periodically moved, the size of the magnetic refrigeration system (10) and energy for driving the magnetic refrigeration system (10) can be reduced.

Modification 1 of First Embodiment: Setting of Intensity of Magnetic Field

The intensity of a magnetic field applied by each of the plurality of magnetic field applicators (30) may be set in accordance with a magnetic working substance content and a magnetic entropy change amount in each of heat transporters (20), among the plurality of heat transporters (20), that are arranged in the heat transport direction and that are targets of magnetic field application by the magnetic field applicators (30). For example, the intensity of a magnetic field applied by the 1st magnetic field applicator (30) may be set in accordance with a magnetic working substance content and a magnetic entropy change amount in each of the 1st first heat transporters (21) and the 1st second heat transporters (22) that are targets of magnetic field application by the 1st magnetic field applicator (30).

With the magnetic refrigeration system (10) according to modification 1 of the first embodiment, the intensity of a magnetic field applied by each of the plurality of magnetic field applicators (30) is set so that change in heat amount due to magnetic field application by each of the plurality of heat transporters (20) is uniform. For example, as the product of the magnetic working substance content and the magnetic entropy change amount in the heat transporter (20) decreases, the intensity of a magnetic field applied to the heat transporter (20) by the magnetic field applicator (30) increases. The intensity of a magnetic field applied by the magnetic field applicator (30) is dependent on the length of a gap between the magnetic field applicator (30) and the heat transporter (20), the magnetic resistance of the magnetic circuit (300) including the magnetic field applicator (30), the magnetic field intensity of the magnet (301), and the like. That is, it is possible to adjust the intensity of a magnetic field applied by the magnetic field applicator (30) by adjusting the length of the gap between the magnetic field applicator (30) and the heat transporter (20), by adjusting the magnetic resistance of the magnetic circuit (300) including the magnetic field applicator (30), or by changing the magnet (301) to a magnet having a different magnetic intensity.

Advantageous Effects of Modification 1 of First Embodiment

As described above, with modification 1 of the first embodiment, by adjusting the intensity of a magnetic field applied by the magnetic field applicator (30), it is possible to adjust change in heat amount, due to magnetic field application, of the heat transporter (20) to which a magnetic field is applied by the magnetic field applicator (30). Thus, it is possible to make change in heat amount, due to magnetic field application, of each of the plurality of heat transporters (20) uniform, and thus it is possible to reduce variation in change in heat amount in the plurality of heat transporters (20) due to magnetic field application.

Modification 2 of First Embodiment: Setting of Magnetic Working Substance Content The magnetic working substance content in each of the plurality of heat transporters (20) is set in accordance with a magnetic entropy change amount of the magnetic working substance in the heat transporter (20) and the intensity of a magnetic field applied to the heat transporter (20) by the magnetic field application unit (35). For example, the magnetic working substance content in the 1st heat transporter (20) may be set in accordance with a magnetic entropy change amount of the magnetic working substance in the 1st heat transporter (20) and the intensity of a magnetic field applied to the 1st heat transporter (20) by the 1st magnetic field applicator (30) of the magnetic field application unit (35).

In the magnetic refrigeration system (10) according to modification 2 of the first embodiment, the magnetic working substance content in each of the plurality of heat transporters (20) is set so that change in heat amount due to magnetic field application by each of the plurality of heat transporters (20) is uniform. For example, as the product of the magnetic working substance content and the magnetic entropy change amount in the heat transporter (20) and the intensity of a magnetic field applied by the magnetic field application unit (35) to the heat transporter (20) decreases, the magnetic working substance content in the heat transporter (20) increases.

Advantageous Effects of Modification 2 of First Embodiment

As described above, with the magnetic refrigeration system (10) according to modification 2 of the first embodiment, it is possible to adjust change in heat amount of the heat transporter (20) due to magnetic field application by adjusting the magnetic working substance content in the heat transporter (20). Thus, it is possible to make change in heat amount, due to magnetic field application, of each of the plurality of heat transporters (20) uniform, and thus it is possible to reduce variation in change in heat amount in the plurality of heat transporters (20) due to magnetic field application.

Modification 3 of First Embodiment: Configuration of Magnetic Circuit

Figure 6:
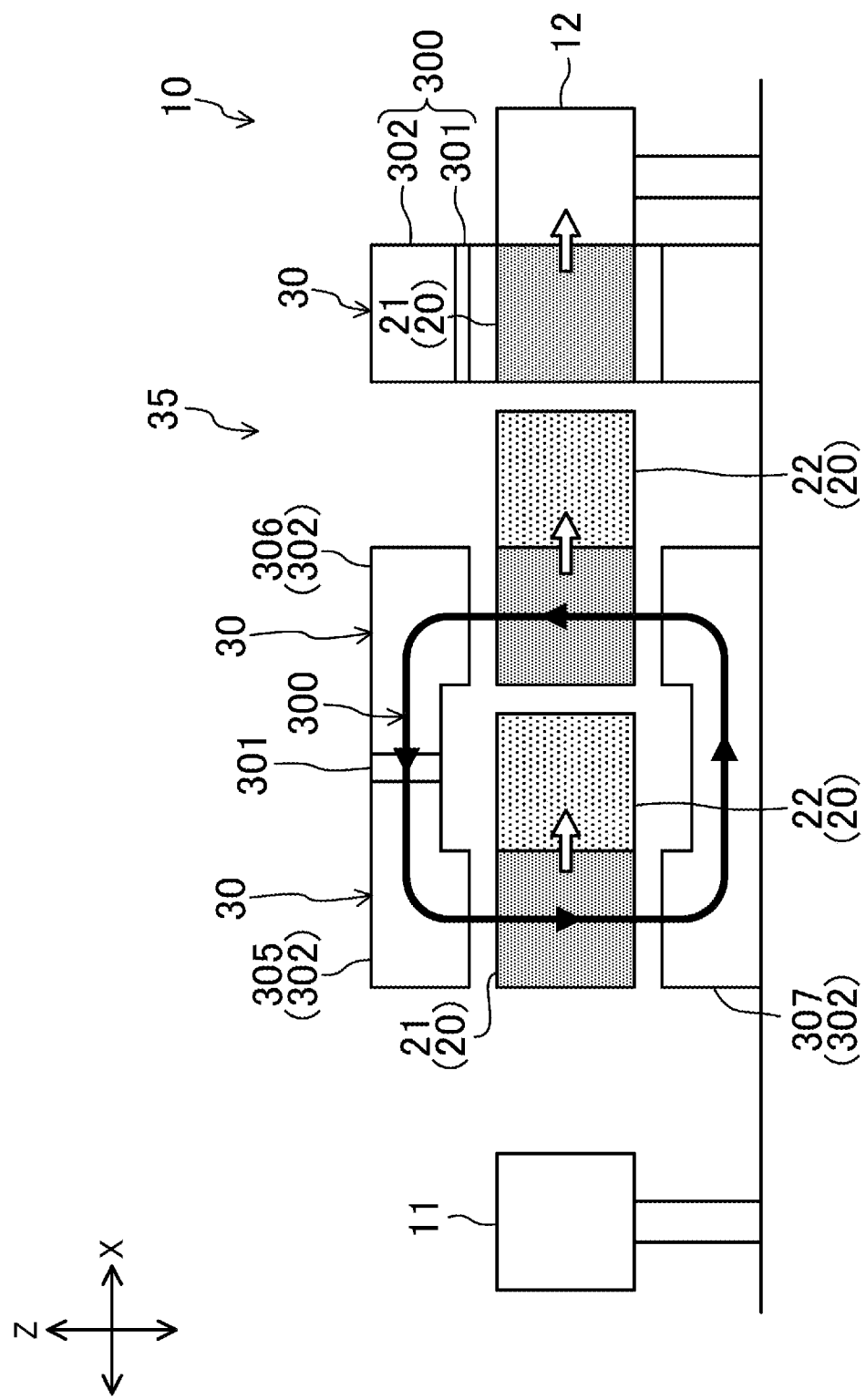
FIG. 6 is an XZ-plan view of an example of the configuration of a magnetic refrigeration system according to a modification 3 of the first embodiment.

As illustrated in FIG. 6, at least two magnetic field applicators (30), among the plurality of magnetic field applicators (30), may be included in one magnetic circuit (300) including one magnet (301).

In the example illustrated in FIG. 6, among three magnetic field applicators (30), the 1st magnetic field applicator (30) and the 2nd magnetic field applicator (30) are included in one magnetic circuit (300). The yoke (302) that forms the magnetic circuit (300) is constituted by a first yoke (305), a second yoke (306), and a third yoke (307). The first yoke (305) and the second yoke (306) are arranged in the heat transport direction (the X-axis direction) and face the third yoke (307) in the second direction (the Z-axis direction) at a predetermined interval. The magnet (301) is interposed between the first yoke (305) and the second yoke (306) and is fixed. With such a configuration, it is possible to apply a magnetic field to the heat transporter (20) disposed between the first yoke (305) and the third yoke (307) and to the heat transporter (20) disposed between the second yoke (306) and the third yoke (307). That is, in this example, the 1st magnetic field applicator (30) is provided between the first yoke (305) and the third yoke (307), and the 2nd magnetic field applicator (30) is provided between the second yoke (306) and the third yoke (307).

Advantageous Effects of Modification 3 of First Embodiment

As described above, in the magnetic refrigeration system (10) according to modification 3 of the first embodiment, the magnetic field application unit (35) includes the plurality of magnetic field applicators (30). The plurality of magnetic field applicators (30) are each configured to apply a magnetic field, and are arranged at predetermined intervals in the heat transport direction. At least two magnetic field applicators (30), among the plurality of magnetic field applicators (30), are included in one magnetic circuit (300) including one magnet (301).

With modification 3 of the first embodiment, because two magnetic field applicators (30) are included in one magnetic circuit (300) including one magnet (301), it is possible to further reduce the number of magnets (301) than in a case where two magnetic field applicators (30) are independently included in two magnetic circuits (two magnetic circuits each having one magnet). Thus, it is possible to reduce the cost of the magnetic refrigeration system (10).

Second Embodiment

Figure 7:
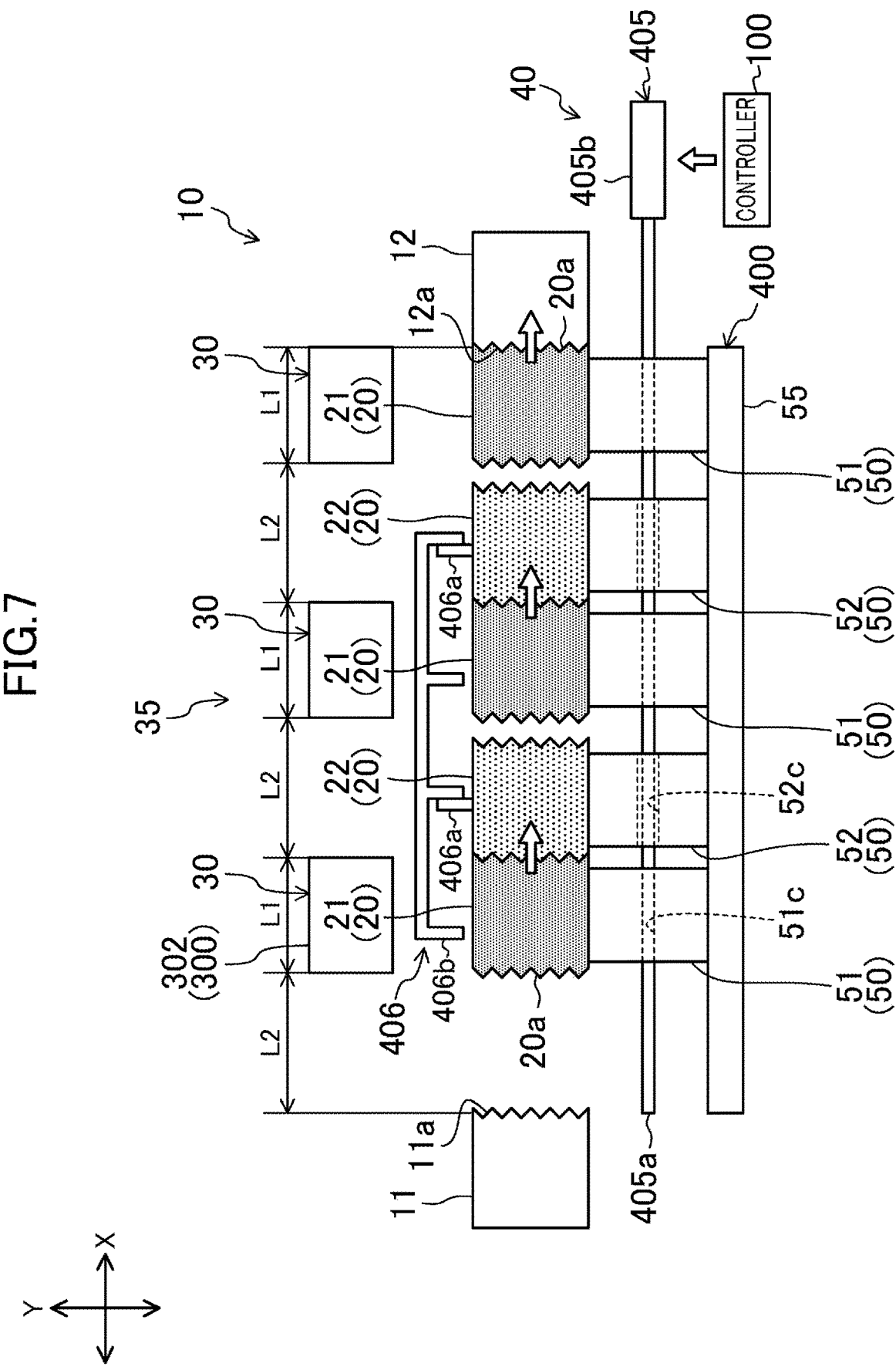
FIG. 7 is an XY-plan view of an example of the configuration (first state) of a magnetic refrigeration system according to a second embodiment.
Figure 8:
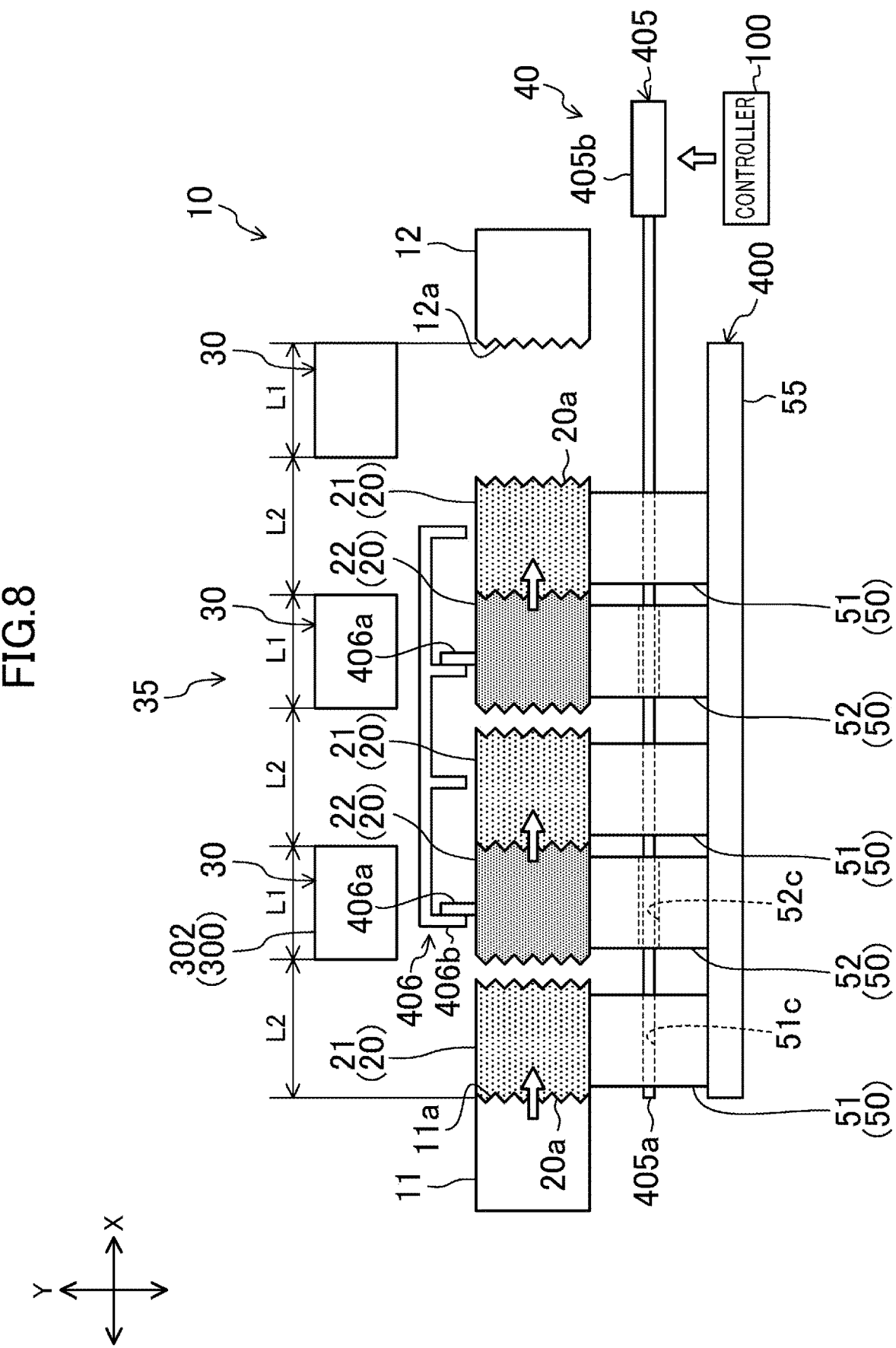
FIG. 8 is an XY-plan view of an example of the configuration (second state) of the magnetic refrigeration system according to the second embodiment.

FIGS. 7 and 8 illustrate an example of the configuration of the magnetic refrigeration system (10) according to a second embodiment. The magnetic refrigeration system (10) according to the second embodiment differs in the configuration of the drive mechanism (40) from the magnetic refrigeration system (10) according to the first embodiment illustrated in FIG. 1. In other respects, the configuration of the magnetic refrigeration system (10) according to the second embodiment is the same as that of the magnetic refrigeration system (10) according to the first embodiment illustrated in FIG. 1.

Drive Mechanism

In the second embodiment, the drive mechanism (40) includes a movable support mechanism (400), a slide mechanism (405), and a restrictor (406).

Movable Support Mechanism

As in the first embodiment, the movable support mechanism (400) includes a plurality of movable bases (50) and a guide member (55). The plurality of movable bases (50) include first movable bases (51) and second movable bases (52). In the second embodiment, a screw hole (51c) is provided in the first movable base (51), and an insertion hole (52c) is provided in the second movable base (52). A ball screw (405a) (described below) is inserted into the screw hole (51c), and the screw hole (51c) meshes with the ball screw (405a). The ball screw (405a) is inserted into the insertion hole (52c), but the insertion hole (52c) does not mesh with the ball screw (405a).

Slide Mechanism

As with the first slide mechanism (401) according to the first embodiment, the slide mechanism (405) moves the first heat transporter (21) in the heat transport direction (the X-axis direction). In this example, the slide mechanism (405) includes the ball screw (405a) a motor (405b).

The ball screw (405a) extends in the heat transport direction, and is inserted into a screw hole (51c) of the first movable base (51) and an insertion hole (52c) of the second movable base (52). The ball screw (405a) meshes with the screw hole (51c) of the first movable base (51), but does not mesh with the insertion hole (52c) of the second movable base (52).

The motor (405b) rotates the ball screw (405a). When the ball screw (405a) is rotated in a first rotation direction, the first movable base (51), in which the screw hole (51c) that meshes with the ball screw (405a) is provided, moves from one side toward the other side in the heat transport direction, and the first heat transporter (21) moves from one side toward the other side in the heat transport direction together with the first movable base (51). When the ball screw (405a) is rotated in a second rotation direction opposite to the first rotation direction, the first movable base (51), in which the screw hole (51c) that meshes with the ball screw (405a) is provided, moves from the other side toward one side in the heat transport direction, and the first heat transporter (21) moves from the other side toward one side in the heat transport direction together with the first movable base (51).

Restrictor

The restrictor (406) restricts the movable range of the second heat transporter (22) that moves in the heat transport direction (the X-axis direction) by being pushed by the first heat transporters (21) that move in the heat transport direction.

The restrictor (406) includes one or more (in this example, two) movable pieces (406a) and a stopper (406b).

The movable piece (406a) is provided on the second heat transporter (22) and protrudes from the second heat transporter (22) in a first direction perpendicular to the heat transport direction (the Y-axis direction). In this example, two movable pieces (406a) respectively protrude from two second heat transporters (22).

The stopper (406b) prevents movement of the second heat transporter (22) in the heat transport direction by making contact with the movable piece (406a) provided on the second heat transporter (22) that moves in the heat transport direction. In this example, four fixed pieces are provided in the stopper (406b); and the 1st fixed piece, the 2nd fixed piece, the 3rd fixed piece, and the 4th fixed piece are arranged in order at predetermined intervals in the heat transport direction from the low-temperature side (the low-temperature-side heat exchanger (11) side) toward the high-temperature side (the high-temperature-side heat exchanger (12) side).

As illustrated in FIG. 7, the 2nd fixed piece and the 4th fixed piece of the stopper (406b) each makes contact with the movable piece (406a) of a second heat transporter (22) that moves toward the high-temperature side (the high-temperature-side heat exchanger (12) side) in the heat transport direction, and thereby hinders the movement of the second heat transporter (22) in the heat transport direction and stops the second heat transporter (22) in a magnetic-field-application-cancellation section (section to which a magnetic field is not applied by the magnetic field application unit (35)). As illustrated in FIG. 7, in the first state, two second heat transporters (22) are disposed in two magnetic-field-application-cancellation sections (the first magnetic-field-application-cancellation section and the second magnetic-field-application-cancellation section).

As illustrated in FIG. 8, the 1st fixed piece and the 3rd fixed piece of the stopper (406b) each makes contact with the movable piece (406a) of a second heat transporter (22) that moves toward the low-temperature side (the low-temperature-side heat exchanger (11) side) in the heat transport direction, and thereby hinders the movement of the second heat transporter (22) in the heat transport direction and stops the second heat transporter (22) in a magnetic-field-application-cancellation section (section to which a magnetic field is not applied by the magnetic field application unit (35)). As illustrated in FIG. 8, in the second state, two second heat transporters (22) are disposed in two magnetic-field-application sections (the first magnetic-field-application section and the second magnetic-field-application section).

Operation of Magnetic Refrigeration System

Next, referring to FIGS. 7 and 8, the operation of the magnetic refrigeration system (10) according to the second embodiment will be described.

As illustrated in FIG. 7, in the first state, as with the first state of the first embodiment illustrated in FIG. 1, heat is transported from the first heat transporter (21) in a heat-generating state toward the second heat transporter (22) in a heat-absorbing state (or the high-temperature-side heat exchanger (12)) that is thermally in contact with the first heat transporter (21) in a heat-generating state.

Next, when a predetermined period elapses after the state of the plurality of heat transporters (20) is switched to the first state, the drive mechanism (40) moves three first heat transporters (21) by the second distance length (L2) toward the low-temperature side (the low-temperature-side heat exchanger (11) side) in the heat transport direction. The two second heat transporters (22) move by the first distance length (L1) toward the low-temperature side in the heat transport direction by being pushed by two first heat transporters (21), among three first heat transporters (21), that move toward the low-temperature side in the heat transport direction. Thus, the state of the plurality of heat transporters (20) changes from the first state (a state illustrated in FIG. 7) to the second state (a state illustrated in FIG. 8).

As illustrated in FIG. 8, in the second state, as with the second state in the first embodiment illustrated in FIG. 5, heat is transported from second heat transporter (22) in a heat-generating state (or the low-temperature-side heat exchanger (11)) toward the first heat transporter (21) in a heat-absorbing state (or the low-temperature-side heat exchanger (11)) that is thermally in contact with the second heat transporter (22) in a heat-generating state.

Next, when a predetermined period elapses after the state of the plurality of heat transporters (20) is switched to the second state, the drive mechanism (40) moves three first heat transporters (21) by the second distance length (L2) toward the high-temperature side (the high-temperature-side heat exchanger (12) side) in the heat transport direction. Two second heat transporters (22) move by the first distance length (L1) toward the high-temperature side in the heat transport direction by being pushed by two first heat transporters (21), among three first heat transporters (21), that move toward the high-temperature side in the heat transport direction. Thus, the state of the plurality of heat transporters (20) changes from the second state (a state illustrated in FIG. 8) to the first state (a state illustrated in FIG. 7).

When the aforementioned operations are repeatedly performed, temperature in the low-temperature-side heat exchanger (11) gradually decreases, and temperature in the high-temperature-side heat exchanger (12) gradually increases.

Advantageous Effects of Second Embodiment

With the magnetic refrigeration system (10) according to the second embodiment, it is possible to obtain advantageous effects similar to those of the magnetic refrigeration system (10) according to the first embodiment. For example, because the end portion (20a) of the heat transporter (20) in the heat transport direction is a heat transfer accelerator, heat transfer between the heat transporter (20) and a member that thermally contacts the heat transporter (20) (the low-temperature-side heat exchanger (11), the high-temperature-side heat exchanger (12), or another heat transporter (20)) can be accelerated. Thus, the efficiency of heat transport can be improved.

In the magnetic refrigeration system (10) according to the second embodiment, the plurality of heat transporters (20) at least include two first heat transporters (21) arranged at an interval in the heat transport direction and one second heat transporter (22) disposed between the two first heat transporters (21). The drive mechanism (40) includes the slide mechanism (405) and the restrictor (406). The slide mechanism (405) moves the first heat transporter (21) in the heat transport direction. The restrictor (406) restricts the movable range of the second heat transporter (22) that moves in the heat transport direction by being pushed by the first heat transporters (21) that move in the heat transport direction.

With the second embodiment, it is possible to move the second heat transporter (22) in the heat transport direction by using the first heat transporter (21) that moves in the heat transport direction. Thus, it is easier to perform control for moving the first heat transporter (21) and the second heat transporter (22) in the heat transport direction than in a case where, in addition to the slide mechanism (405) that moves the first heat transporter (21) in the heat transport direction, another slide mechanism that moves the second heat transporter (22) in the heat transport direction is provided.

Other Embodiments

Figure 9:
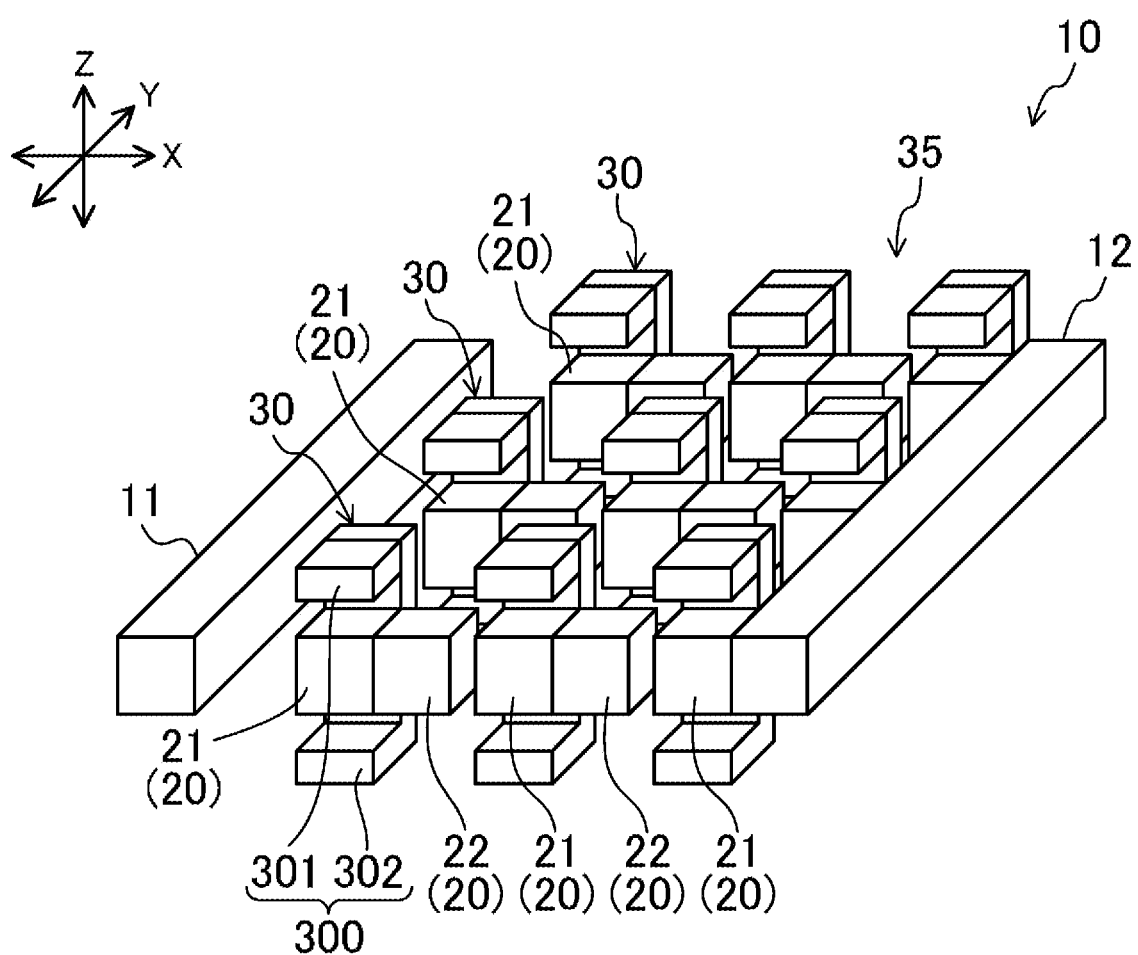
FIG. 9 is a schematic perspective view of an example of an arrangement example 1 of heat transporters.

As illustrated in FIG. 9, the plurality of heat transporters (20) may be arranged in a two-dimensional pattern having the heat transport direction as the X-axis direction and a first direction perpendicular to the heat transport direction as the Y-axis direction.

In the example illustrated in FIG. 9, the yoke (302) has an arm portion that has an L-shape in a cross section in the YZ-plane and that extends in the Y-axis direction. The magnet (301) has a rectangular-parallelepiped shape and is disposed so as to face the arm portion of the yoke (302) in the Z-axis direction. With such a configuration, it is possible to apply a magnetic field to the heat transporter (20) disposed between the magnet (301) and the arm portion of the yoke (302). That is, in this example, the magnetic field applicator (30) is provided between the magnet (301) and the arm portion of the yoke (302).

Figure 10:
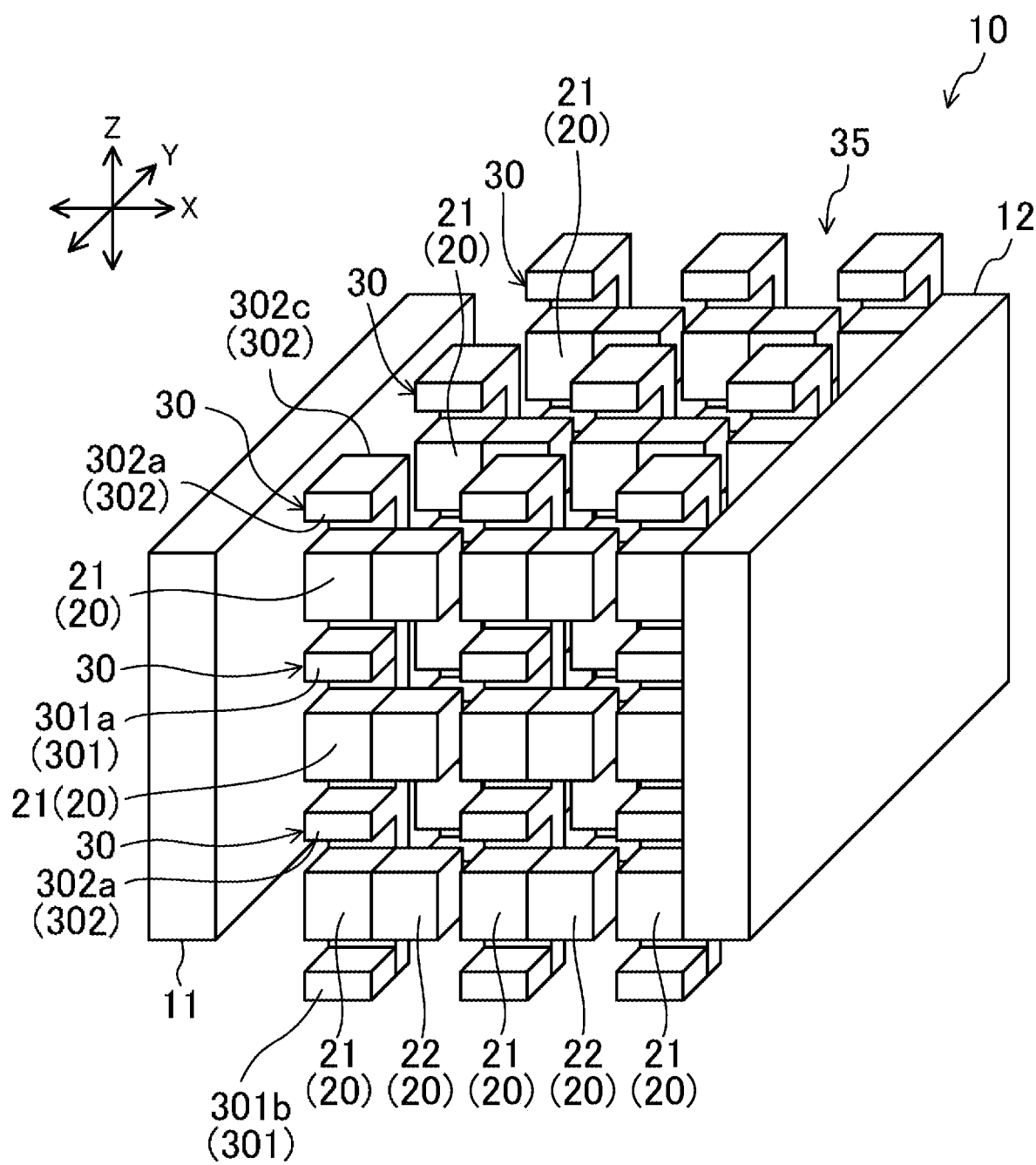
FIG. 10 is a schematic perspective view of an example of an arrangement example 2 of heat transporters.

As illustrated in FIG. 10, the plurality of heat transporters (20) may be arranged in a three-dimensional pattern having the heat transport direction as the X-axis direction, the first direction as the Y-axis direction, and a direction perpendicular to the heat transport direction and the first direction as the Z-axis direction.

In the example illustrated in FIG. 10, the yoke (302) has an F-shape in a cross section in the YZ-plane and includes a first arm portion (302a), a second arm portion (302b), and a coupling portion (302c). The magnet (301) is constituted by a first magnet (301a) and a second magnet (301b). The first arm portion (302a), the second arm portion (302b), the first magnet (301a), and the second magnet (301b) of the yoke (302) each has a rectangular-parallelepiped shape. The first arm portion (302a), the first magnet (301a), the second arm portion (302b), and the second magnet (301b) are arranged in order at predetermined intervals from one side toward the other side in the Z-axis direction. The coupling portion (302c) couples the first arm portion (302a) and the second arm portion (302b) of the yoke (302), the first magnet (301a), and the second magnet (301b) to each other. With such a configuration, it is possible to apply a magnetic field to the heat transporter (20) disposed between the first arm portion (302a) of the yoke (302) and the first magnet (301a), the heat transporter (20) disposed between the first magnet (301a) and the second arm portion (302b) of the yoke (302), and the heat transporter (20) disposed between the second arm portion (302b) of the yoke (302) and the second magnet (301b). That is, in this example, the magnetic field applicators (30) are provided between the first arm portion (302a) of the yoke (302) and the first magnet (301a), between the first magnet (301a) and the second arm portion (302b) of the yoke (302), and between the second arm portion (302b) of the yoke (302) and the second magnet (301b).

In the examples described above, the magnetic field application unit (35) is fixed, and the drive mechanism (40) moves the plurality of heat transporters (20) in the heat transport direction. However, the drive mechanism (40) may be configured to move both of the magnetic field application unit (35) and the plurality of heat transporters (20) in the heat transport direction.

In the examples described above, the heat transporter (20) enters a heat-generating state due to magnetic field application and enters a heat-absorbing state due to cancellation of magnetic field application. However, the heat transporter (20) may be configured to enter a heat-absorbing state due to magnetic field application and to enter a heat-generating state due to cancellation of magnetic field application. That is, the heat transporter (20) may be made of a magnetic working substance that generates heat due to magnetic field application and absorbs heat due to cancellation of magnetic field application, or may be made of a magnetic working substance that absorbs heat due to magnetic field application and generates heat due to cancellation of magnetic field application.

In the examples described above, an end surface of the heat transporter (20) in the heat transport direction is an uneven surface, and the end portion (20a) of the heat transporter (20) in the heat transport direction is constituted by the first heat-transfer member (201). However, an end surface the heat transporter (20) in the heat transport direction may be an uneven surface in a state in which the end portion (20a) of the heat transporter (20) is not constituted by the first heat-transfer member (201) (for example, in a state in which an end portion of the body (200) in the heat transport direction constitutes an end portion (20*a*) of the heat transporter (20)); or the end portion (20*a*) of the heat transporter (20) may be constituted by the first heat-transfer member (201) in a state in which an end surface of the heat transporter (20) in the heat transport direction is not an uneven surface (for example, in a state in which an end surface of the heat transporter (20) in the heat transport direction is a flat surface). In either of these cases, the end portion (20*a*) of the heat transporter (20) in the heat transport direction can be made to be a heat transfer accelerator.

It should be understood that the embodiments and modifications described above can be modified in various ways within the spirit and scope of the claims. The embodiments and modifications described above may be combined or replaced as appropriate, as long as the functions of the object of the present disclosure are not impaired.

As described above, the present disclosure is applicable to a magnetic refrigeration system.

The invention claimed is:

1. A magnetic refrigeration system configured to transport heat from a low-temperature-side heat exchanger toward a high-temperature-side heat exchanger, the magnetic refrigeration system comprising:
    a plurality of heat transporters, each of the heat transporters being configured to be switched between a heat-generating state and a heat-absorbing state in response to magnetic field application and cancellation of the magnetic field application, the plurality of heat transporters being arranged between the low-temperature-side heat exchanger and the high-temperature-side heat exchanger;
    a magnetic field application unit configured to apply a magnetic field to the plurality of heat transporters so that a heat transporter of the heat transports to which a magnetic field is applied and a heat transporter of the heat transporters to which a magnetic field is not applied are alternately arranged in a heat transport direction from the low-temperature-side heat exchanger toward the high-temperature-side heat exchanger; and
    a drive mechanism configured to periodically move at least the plurality of heat transporters
        so that a heat transporter to which the magnetic field is applied by the magnetic field application unit is periodically switched and
        so that a state of thermal contact among the low-temperature-side heat exchanger, the plurality of heat transporters, and the high-temperature-side heat exchanger is periodically switched,
    an end portion of at least one heat transporter of the plurality of heat transporters, in the heat transport direction, is a heat transfer accelerator that accelerates heat transfer.

2. The magnetic refrigeration system according to claim 1, wherein
    an end surface of at least one heat transporter of the plurality of heat transporters, in the heat transport direction, is an uneven surface.

3. The magnetic refrigeration system according to claim 2, wherein
    at least one heat transporter of the plurality of heat transporters includes
        a body that is made of a magnetic working substance having a magnetocaloric effect and that is switched between a heat-generating state and a heat-absorbing state in response to the magnetic field application and cancellation of the magnetic field application, and
        a first heat-transfer member
            that has a heat conductivity higher than a heat conductivity of the body,
            that is provided at an end portion of the body in the heat transport direction, and
            that constitutes an end portion of the heat transporter in the heat transport direction.

4. The magnetic refrigeration system according to claim 3, wherein
    at least one heat transporter of the plurality of heat transporters further includes a second heat-transfer member
        that has a heat conductivity higher than a heat conductivity of the body,
        that extends inside of the body in the heat transport direction, and
        that is connected to the first heat-transfer member.

5. The magnetic refrigeration system according to claim 1, wherein
    at least one heat transporter of the plurality of heat transporters, includes
        a body that is made of a magnetic working substance having a magnetocaloric effect and that is switched between a heat-generating state and a heat-absorbing state in response to the magnetic field application and cancellation of the magnetic field application, and
        a first heat-transfer member
            that has a heat conductivity higher than a heat conductivity of the body,
            that is provided at an end portion of the body in the heat transport direction, and
            that constitutes an end portion of the heat transporter in the heat transport direction.

6. The magnetic refrigeration system according to claim 5, wherein
    at least one heat transporter of the plurality of heat transporters further includes a second heat-transfer member
        that has a heat conductivity higher than a heat conductivity of the body,
        that extends inside of the body in the heat transport direction, and
        that is connected to the first heat-transfer member.

7. The magnetic refrigeration system according to claim 1, wherein
    a heat insulation member is provided in at least one heat transporter of the plurality of heat transporters, and the heat insulation member covers a part of the heat transporter excluding both end surfaces in the heat transport direction.

8. The magnetic refrigeration system according to claim 1, wherein
    the magnetic field application unit includes a plurality of magnetic field applicators, each magnetic field applicator is configured to apply a magnetic field, and the plurality of magnetic field applicators are arranged at predetermined intervals in the heat transport direction,
    each of the plurality of heat transporters contains a magnetic working substance having a magnetocaloric effect, and
    an intensity of a magnetic field applied by each of the plurality of magnetic field applicators is set in accordance with a magnetic working substance content and a magnetic entropy change amount in each of heat transporters of the plurality of heat transporters, which are arranged in the heat transport direction and that are targets of magnetic field application by the magnetic field applicators.

9. The magnetic refrigeration system according to claim 1, wherein
each of the plurality of heat transporters contains a magnetic working substance having a magnetocaloric effect, and
a magnetic working substance content in each of the plurality of heat transporters is set in accordance with a magnetic entropy change amount of the magnetic working substance in the heat transporter and an intensity of a magnetic field applied to the heat transporter by the magnetic field application unit.

10. The magnetic refrigeration system according to claim 1, wherein
the magnetic field application unit includes a plurality of magnetic field applicators, each magnetic field applicator is configured to apply a magnetic field, and the plurality of magnetic field applicators are arranged at predetermined intervals in the heat transport direction, and
at least two magnetic field applicators of the plurality of magnetic field applicators are included in one magnetic circuit including one magnet.

11. The magnetic refrigeration system according to claim 1, wherein
the magnetic field application unit is fixed, and
the drive mechanism is configured to move the plurality of heat transporters in the heat transport direction.

12. The magnetic refrigeration system according to claim 11, wherein
the plurality of heat transporters include at least two first heat transporters arranged at an interval in the heat transport direction and one second heat transporter disposed between the two first heat transporters, and
the drive mechanism includes
a slide mechanism configured to move the first heat transporters in the heat transport direction, and
a restrictor configured to restrict a movable range of the second heat transporter in the heat transport direction by being pushed by the first heat transporters.

13. The magnetic refrigeration system according to claim 1, wherein
the plurality of heat transporters are arranged in
a two-dimensional pattern having the heat transport direction as an X-axis direction and a first direction perpendicular to the heat transport direction as a Y-axis direction or
in a three-dimensional pattern having the heat transport direction as an X-axis direction, the first direction as a Y-axis direction, and a second direction perpendicular to the heat transport direction and the first direction as a Z-axis direction.

* * * * *